Figure 1:
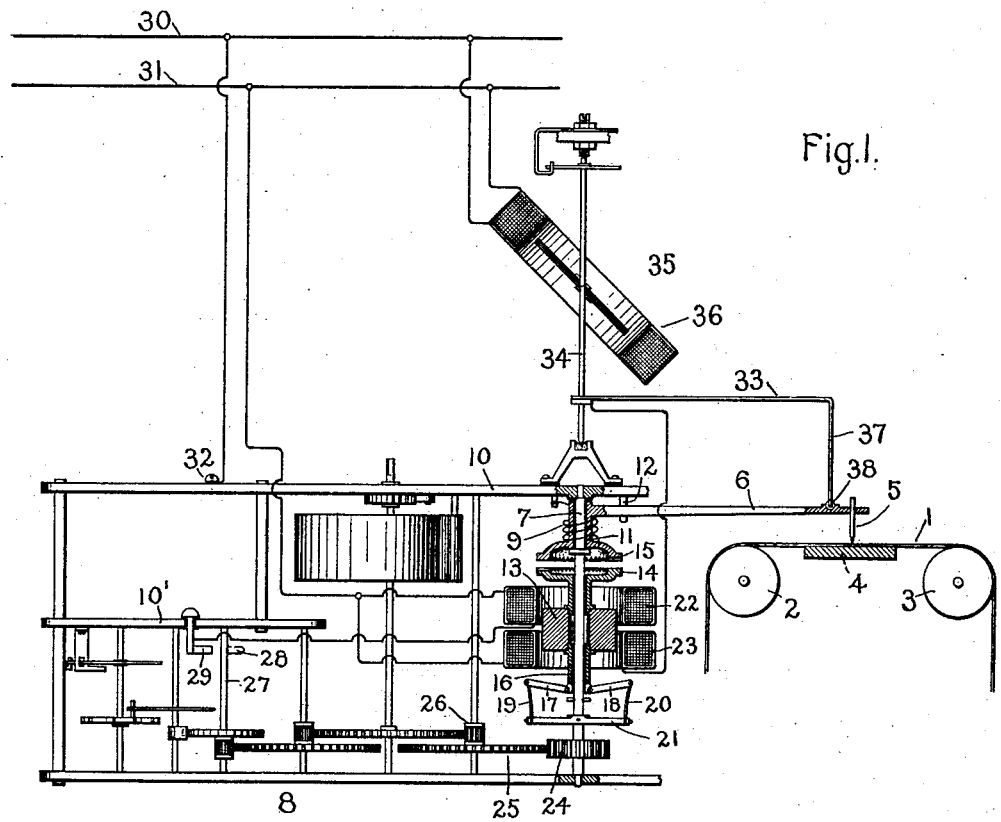

No. 717,376. Patented Dec. 30, 1902.
W. C. FISH & F. P. COX.
ELECTRIC RECORDING INSTRUMENT.
(Application filed June 12, 1901.)
(No Model.)

Witnesses.
John Ellis Glenn.
Benjamin B. Hull.

Inventors.
Walter C. Fish,
Frank P. Cox.
by Albert G. Davis
Atty.

UNITED STATES PATENT OFFICE.

WALTER C. FISH AND FRANK P. COX, OF LYNN, MASSACHUSETTS, ASSIGNORS TO GENERAL ELECTRIC COMPANY, A CORPORATION OF NEW YORK.

ELECTRIC RECORDING INSTRUMENT.

SPECIFICATION forming part of Letters Patent No. 717,376, dated December 30, 1902.

Application filed June 12, 1901. Serial No. 64,231. (No model.)

*To all whom it may concern:*

Be it known that we, WALTER C. FISH and FRANK P. COX, citizens of the United States, residing at Lynn, county of Essex, State of Massachusetts, have invented certain new and useful Improvements in Electric Recording Instruments, (Case No. 1,847,) of which the following is a specification.

Electric recording devices of that type in which an indicating instrument of some sort moves a marking device upon a paper or other recording surface, thereby drawing a curve or line representing variations of the quantity measured, are objectionable for the reason that the friction of the marking device upon the recording-surface restrains the motion of the indicating instrument to a greater or less extent, and thereby impairs the accuracy of its registration. Our present invention is intended to obviate this defect, and to this end consists, generally speaking, of an indicating instrument arranged to control the movements of a recording mechanism, but not to actuate the same. The indicating instrument being thus unrestrained by friction or other causes is free to assume any position demanded by the variations of the quantity measured, and its accuracy is thus not impaired, as would be the case were it required to trace a record directly instead of merely controlling the tracing of the record.

In the specific embodiment of our invention hereinafter described there are two coaxially-mounted arms, one of which carries a pencil, stylus, or other recording device and is moved forward periodically over a recording-surface. The other arm is carried by the movable member of an indicating instrument—such, for example, as a voltmeter, ammeter, wattmeter, or the like. The pencil or stylus carrying arm is moved forward until a contact carried thereby engages a contact carried by the arm of the indicating instrument, the position at which this engagement takes place corresponding to the magnitude of the quantity measured at that instant. An electric circuit is closed by the engagement of these two parts, which acts by suitable means to retract the curve-drawing arm, which after a suitable interval is again moved forward and the operation repeated. The record produced on the recording-surface, which of course is drawn forward uniformly under the recording device, will thus be seen to consist of a series of saw-teeth the position of the points of which indicate from moment to moment the value of the quantity measured.

The features of novelty possessed by our invention are set forth particularly in the claims appended hereto, while the invention itself, both as to its details of construction and mode of operation, is described more at length in the following specification, which is to be taken in connection with the accompanying drawings, in which—

Figure 2:
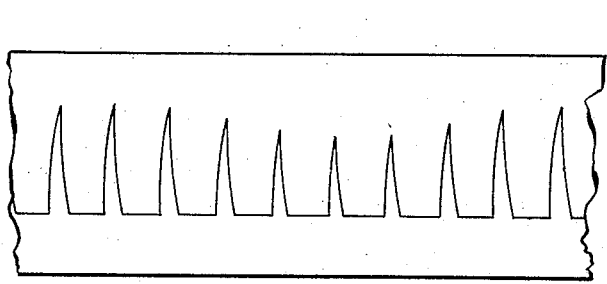

Figure 1 represents our invention partly in diagram, and Fig. 2 a view of a record made by the recording mechanism thus indicated.

The recording-surface upon which the record is made may consist of a strip of paper 1, which passes over rollers 2 3 and may be drawn either backward or forward, as the case may be, by suitable clockwork or other mechanism of well-known character. As the particular mechanism for traversing the paper-strip may be of well-understood construction and possesses no novel features, no detailed illustration of the same herein is deemed necessary. The platen 4, over which the strip 1 passes, serves as a firm support for the strip as the recording-pencil 5 moves backward and forward over the same. This recording pencil, pen, stylus, or other device 5, which is here indicated merely conventionally, is mounted upon the end of an arm 6, sleeved upon a shaft 7, forming part of a clockwork mechanism, (indicated generally at 8.) A spring 9, one end of which is attached to the side piece 10 of the clockwork mechanism and the other end to the sleeve 11, carrying the arm 6, tends to hold the arm 6 in its zero position against a stop 12 or some other similar device. The same shaft 7, which carries the arm 6, also carries an armature 13, of magnetic material, loosely sleeved thereon and capable of longitudinal movement. The armature 13 has secured thereto at one end one member 14 of a clutch, the other member, 15, being formed integrally with or attached to the sleeve 11, carrying the arm 6. The opposing faces of the members 14 and 15 may be toothed or notched in order to afford a positive engagement between the same when brought into operative relation to each other. The opposite end of the armature 13 is secured to a sleeve 16, carrying links 17 and 18, the outer ends of which are pivotally attached to springs 19 and 20, respectively, these springs being secured respectively to opposite ends of a bar or other device 21, fixed to the shaft 7.

In operative relation to the armature 13 are two connecting solenoids or coils 22 23. In order that the effects of these coils when excited may be concentrated upon the armature 13, we prefer to make the clutch member 14 and the sleeve 16 out of some non-magnetic material—as, for example, brass.

The object of the links 17 and 18 and the coöperating springs 19 and 20 is to mechanically hold the armature 13 and parts carried thereby in either of its extreme positions when once moved thereto by one of the coils or solenoids 22 23. In the position shown it will be seen that the springs, acting through their coöperating links, tend to force the armature 13 to its lower position, while if the armature were moved into its upward position the inner end of the links would be inclined toward the shaft 7 in a direction such that the tension of the springs would tend to hold the parts in this upper position.

A clockwork or other suitable driving mechanism—such, for example, as indicated—causes a regular rotation of the shaft 7, motion being transmitted thereto by means of the gear-wheels 24 25 26 &c. The driving mechanism may be spring-actuated, electrically actuated, or otherwise without departing from the spirit of our invention. We have, however, for convenience of illustration shown a spring movement.

One of the shafts—as, for example, the shaft 27—carries a contact-finger 28, adapted to engage periodically with a fixed spring-contact 29, carried by the side piece or framework 10', but insulated therefrom, as indicated. A source of current—as, for example, the mains 30 31—has one terminal joined electrically to the clockwork-frame, as indicated at 32. The other terminal or main is connected electrically with one terminal of each of the coils 22 and 23. The remaining terminal of coil 22 is joined to the insulated contact 29, while the remaining terminal of the coil 23 is connected to a contact-carrying arm 33, attached to the shaft 34 of the movable member of some indicating instrument, as 35, the indications of which it is desired to record. This indicating instrument is here shown as a voltmeter of the inclined-coil type, such as set forth with particularity in the patent to Elihu Thomson, No. 542,663, dated July 16, 1895. The actuating-coil 36 is represented as connected across the mains 30 31 for the purpose of recording the variations of voltage, if any, between said mains. It will be evident, however, that so far as our present invention is concerned the indicating instrument 35 may be of any character whatever, provided it has a movable member which furnishes an indication of some quantity to be measured. The contact-carrying arm 33 has a downwardly-extending end 37, the point of which is adapted to engage a globule of mercury 38, carried in a suitable cavity formed in the end of the arm 6.

From the previous description, it will be understood that the contact-arm 28 engages momentarily, at suitable intervals, the fixed contact 29, thereby closing the circuit of the coil 22, which thereupon attracts the armature 13 and moves the clutch member 14 into operative engagement with the member 15, against which it is then held by the action of the springs 19 20. The shaft 7, which moves forward continuously, therefore transmits motion to the sleeve 11 and moves forward the arm 6 against the tension of the spring 9. This forward motion continues until the mercury globule 38 or other contact meets the coöperating end 37 of the arm 33, attached to the movable member of the indicating instrument 35, this movable member having already assumed a position correctly indicating the voltage between the mains 30 and 31. As soon as the contacts mentioned come together the circuit through the coil 23 is closed and the armature 13 retracted from its upper position, in which it was previously held through the action of the springs 19 and 20, the action of the coil 22 having been but momentary and serving only to move the armature into this upper position.

The clutch members 14 and 15 being separated by downward motion of the armature 13, the spring 9 immediately returns the arm 6 to its zero position. When the contact-arm 28 again comes around and engages the fixed contact 29, the above operation is repeated.

Since the recording-surface is all the time moving slowly forward, it will be evident that the forward path of the recording device will for this reason not exactly coincide with its return-path. The result of the periodic advances and retreats of the recording device 5 is, therefore, to mark upon the recording-strip a series of peaks or teeth, as indicated, for example, in Fig. 2. It will be evident, however, that the points of the teeth thus produced will correctly represent the variations of the quantity measured from moment to moment.

What we claim as new, and desire to secure by Letters Patent of the United States, is—

1. The combination of an electrical indicating instrument having a movable member free to assume without restraint any position within its range of indication, a mechanically-actuated curve-drawing device, and means for controlling said device by said indicating instrument.

2. The combination of a recording device, means for periodically advancing said device, an indicating instrument, and means controlled by said indicating instrument for checking the advance of said recording device.

3. The combination of a recording device, means for periodically advancing and withdrawing said device, an indicating instrument, and means controlled by said indicating instrument for determining the amplitude of each advance.

4. The combination of a recording-surface, an indicating instrument, a recording device, and means controlled by said instrument for periodically traversing said recording device over said surface.

5. The combination of a recording-surface, an indicating instrument, and means controlled by said instrument for drawing a series of peaks or ordinates thereon, the ends of which represent from moment to moment the quantity measured by said indicating instrument.

6. The combination of a periodically-actuated arm, an indicating instrument carrying a contact, and means controlled by the engagement of said contact with said arm for checking further forward movement of said arm.

7. The combination of a periodically-reciprocated curve-drawing device, an indicating instrument, and means controlled by said instrument for reversing the direction of movement of said device.

8. The combination of a pencil or other marking device, means for periodically reciprocating said device, an indicating instrument, and means controlled by said instrument for governing the amplitude of such reciprocations.

9. The combination of a pencil or other marking device, a movable recording-surface coöperating therewith, means for periodically reciprocating said pencil or marking device, an indicating device or instrument, and means controlled thereby for governing the amplitude of such reciprocations.

In witness whereof we have hereunto set our hands this 8th day of June, 1901.

WALTER C. FISH.
FRANK P. COX.

Witnesses:
DUGALD McK. McKILLOP,
JOHN A. McMANUS.